United States Patent
Ford et al.

(10) Patent No.: US 11,055,487 B2
(45) Date of Patent: Jul. 6, 2021

(54) UNDERSTANDING NATURAL LANGUAGE USING SPLIT-PHRASE TUMBLING-FREQUENCY PHRASE-CHAIN PARSING

(71) Applicant: QwikIntelligence, Inc., Marriottsville, MD (US)

(72) Inventors: William Randolph Ford, Marriottsville, MD (US); Alfred Rives Berkeley, III, Baltimore, MD (US); Mark Alexander Newman, Odenton, MD (US)

(73) Assignee: QwikIntelligence, Inc., Marriottsville, MD (US)

( * ) Notice: Subject to any disclaimer, the term of this patent is extended or adjusted under 35 U.S.C. 154(b) by 0 days.

(21) Appl. No.: 16/855,947

(22) Filed: Apr. 22, 2020

(65) Prior Publication Data

US 2020/0257854 A1 Aug. 13, 2020

Related U.S. Application Data

(63) Continuation-in-part of application No. 16/657,014, filed on Oct. 18, 2019, now Pat. No. 10,783,330.
(Continued)

(51) Int. Cl.
*G06F 17/27* (2006.01)
*G06F 40/205* (2020.01)
(Continued)

(52) U.S. Cl.
CPC .......... *G06F 40/205* (2020.01); *G06F 40/284* (2020.01); *G06F 40/30* (2020.01)

(58) Field of Classification Search
CPC ...... G06F 17/27; G06F 40/284; G06F 40/205; G06F 40/30
See application file for complete search history.

(56) References Cited

U.S. PATENT DOCUMENTS

| | | | |
|---|---|---|---|
| 4,730,270 A | * | 3/1988 | Okajima ............... G06F 40/211 704/2 |
| 5,095,432 A | | 3/1992 | Reed |

(Continued)

OTHER PUBLICATIONS

Abney, S. "Parsing by Chunks" Principle-Based Parsing, R. Berwick, S. Abney, C. Tenny (eds.), Kluwer Academic Publishers., Nov. 10, 1994, pp. 1-18.

(Continued)

*Primary Examiner* — Michael Colucci
(74) *Attorney, Agent, or Firm* — Cameron LLP

(57) ABSTRACT

Of the four primary approaches to processing language by computer, only the parsing approach considers the semantic and syntactic components from the start. In doing so, however, the required resources expand rapidly as the scope of the language processed increases. And as that scope increases, the performance of parsing systems decreases. A natural language processor uses a tumbling-frequency phrase chain parser as described herein which circumvents this resource-intensive step in parsing, while quickly and almost effortlessly arriving at the next step in natural-language processing with far more accurate results involving a partitioning dictionary and phrase chains.

4 Claims, 2 Drawing Sheets

Related U.S. Application Data

(60) Provisional application No. 62/748,200, filed on Oct. 19, 2018.

(51) Int. Cl.
    *G06F 40/284* (2020.01)
    *G06F 40/30* (2020.01)

(56) References Cited

U.S. PATENT DOCUMENTS

| | | | | |
|---|---|---|---|---|
| 5,551,049 | A * | 8/1996 | Kaplan | G06F 40/247 |
| | | | | 715/206 |
| 5,926,784 | A | 7/1999 | Richardson et al. | |
| 5,930,746 | A | 7/1999 | Ting | |
| 6,108,620 | A | 8/2000 | Richardson et al. | |
| 6,236,959 | B1 | 5/2001 | Welse | |
| 6,285,978 | B1 * | 9/2001 | Bernth | G06F 40/51 |
| | | | | 704/7 |
| 7,197,451 | B1 * | 3/2007 | Carter | G06F 40/30 |
| | | | | 704/10 |
| 7,360,151 | B1 * | 4/2008 | Froloff | G06F 40/186 |
| | | | | 715/255 |
| 7,389,225 | B1 * | 6/2008 | Jensen | G06F 40/30 |
| | | | | 704/9 |
| 7,599,831 | B2 | 10/2009 | Ford | |
| 9,720,903 | B2 | 8/2017 | New | |
| 9,916,420 | B2 * | 3/2018 | Cardoza | G06F 19/32 |
| 10,032,127 | B2 * | 7/2018 | Habboush | G06N 5/025 |
| 10,185,748 | B1 * | 1/2019 | Ayzenshtat | G06F 16/90324 |
| 10,496,743 | B2 * | 12/2019 | Snider | G16H 10/60 |
| 2004/0019482 | A1 | 1/2004 | Holub | G06Q 50/24 |
| | | | | 704/231 |
| 2007/0073745 | A1 * | 3/2007 | Scott | G06F 16/374 |
| 2007/0106491 | A1 * | 5/2007 | Carter | G06F 40/30 |
| | | | | 704/4 |
| 2007/0106651 | A1 * | 5/2007 | Isaacson | H04N 21/4394 |
| 2010/0228693 | A1 * | 9/2010 | Dawson | G06F 16/322 |
| | | | | 706/12 |
| 2013/0041685 | A1 * | 2/2013 | Yegnanarayanan | G06F 19/00 |
| | | | | 705/2 |
| 2017/0277676 | A1 * | 9/2017 | Vogel | G06F 40/284 |
| 2017/0277996 | A1 * | 9/2017 | Vogel | G06F 40/30 |

OTHER PUBLICATIONS

Bobrow, D., Kaplan, R., Kay, M., Norman, D., Thompson, H. and Winograd, T. (1977) GUS, a frame driven dialog system, Artificial Intelligence, 8: 155-173.

Chomsky, N. Verbal Behavior, by B. F. Skinner, Language, 1959, 35, 26-58.

Farreras, I. G., & Ford, W. R. (Jun. 2014), "The evolution of a discipline: How the semantics of introductory psychology textbooks have changed over the last century," paper presented at the 46th annual meeting of Cheiron: The International Society for the History of Behavioral and Social Sciences, Frederick, MD.

Ford, W. R., & Farreras, L. G. (Apr. 2015), "Using a multi-stage pattern reduction NLP for syntactic analysis of instructured data," paper presented at the 2015 Analytics Applications Summit, Harrisburg, PA.

Gervain, J, et al. (2013), "Word frequency cues word order in adults: cross-linguistic evidence," Front Psychol., 02.

Green, C. (1969), "Theorem proving by resolution as a basis for question-answering systems," Machine Intelligence, 4: pp. 183-205.

Hill, J. R., Ford, W. R., & Farreras, I. G. (2015), "Real conversations with artificial intelligence: A comparison between human-human online conversations and human-chatbot conversations," Computers in Human Behavior, 49, pp. 245-250.

Sowa, J., "Pursuing the Goal of Language Understanding," paper presented at the 2015 Analytics Applications Summit, Harrisburg, PA.

Farreras, I. G. & Ford, W R. (Jun. 2014), "The evolution of a discipline: How the semantics of introductory psychology textbooks have changed over the last century," paper presented at the 16th annual meeting of Chelron: The International Society for the History of Behavioral and Social Sciences, Frederick, MD.

* cited by examiner

© QWIKINTELLIGENCE 2020

© QWIKINTELLIGENCE 2020

UNDERSTANDING NATURAL LANGUAGE USING SPLIT-PHRASE TUMBLING-FREQUENCY PHRASE-CHAIN PARSING

This application is a continuation-in-part of U. S. patent application Ser. No. 16/657,014 filed Oct. 18, 2019, which claims the benefit of the right of priority to U.S. Provisional Patent Application Ser. No. 62/748,020 filed Oct. 19, 2018, both applications incorporated by reference as to their entire contents. Portions of this patent document contain material that is subject to copyright protection. The copyright owner has no objection to the facsimile reproduction by anyone of the patent document or the patent disclosure as it appears in the Patent and Trademark Office patent file or record, but otherwise reserves all copyrights whatsoever.

TECHNICAL FIELD

The present embodiments generally relate to the field of natural language processing, and, more particularly, to our discovery that a small and finite set of "phrase chains" created using a parsing-based processor account for a considerable percentage of human language. The significance of this result is that, since we are dealing with a finite list, these phrase chains, once identified, can be pre-encoded meaning for allowing for simpler, faster, and more accurate natural language processing at a semantic level than any known parsing approach known in the prior art. The specific embodiments presented here extends the method described in U.S. patent application Ser. No.16/657,014 filed Oct. 18, 2019, with the goal of creating an even more generalizable language table to cover domains of language processing with complex and less frequently used words and phrases such as those taken from scientific journals. This is accomplished by making a modification in the prior procedure, resulting in identified phrases being split into two sub-phrases, where the first part or alpha sub-phrase contains the more functional component of the phrase while the second beta sub-phrase contains the specific content of the phrase. That is to say, in this approach, phrases are separated into two sub-phrases at the point where non-auxiliary verbs and both common and proper nouns begin.

BACKGROUND

The cost of electronic storage has reduced dramatically and consistently over time. One artifact of this reduction in the cost of electronic storage is that we are now collecting more data than ever before, and the most significant percentage of the data is unstructured. Unfortunately, this data can only be partially analyzed at best. And while, over the last five decades, many complex methods and algorithms for processing natural language have been developed, efforts to find more practical and efficient natural language processing solutions have dramatically intensified and expanded in reaction to the increasing size of unstructured data on big data systems.

Four primary approaches have developed in natural language processing by computer-based natural language processors (NLP) over the last half-century: 1) transformational grammar simulations, 2) keyword/key-phrase approaches, 3) surface structure matching, and 4) statistical language processing. A Bibliography is provided at the end of the DETAILED DESCRIPTION for those interested in understanding the state of the art of natural language processing.

These four approaches can be loosely divided into two groups, those that process toward the meaning or deep structure of a sentence (transformational grammar and statistical language processing), and those that choose to remain in the realm of surface structure representations (keyword/key-phrase and surface structure matching). Those methods that move toward deep structure, whether statistical or not, almost always begin with parsing techniques. Computer-based parsing is as old as Natural language processing (NLP) itself (for example, Green et al., 1961). In the simplest portrayal of this approach, human language is transformed in a manner analogous to drawing the sentence diagrams that children learn in school.

Regardless of the specific parsing method used, however, sentences of human communication are processed to determine parts of speech for each word, along with assigning word meaning, and, from there, rules are typically employed to determine the syntactic structure of the processed communication. Then, finally, an attempt is made to fit the derived structure against recognized structures in a rule-based table, leading to interpreting the deep structure, i.e., its meaning.

Natural language processors using the parsing approach are characteristically large, may be complex, and generally require a great deal of processing power to operate. Originally there was considerable human overhead in the development and maintenance of such systems. One trend for the last few decades has been to offset this human overhead by reverting to statistical language processing and other machine-learning approaches.

Unfortunately, the greatest weakness of parsing systems is the inefficient accommodation of users' variability of expression. There are thousands of ways that a user might ask for a phone number, and parsing-based systems are not very efficient or even capable of accepting the breadth of different users' unique expressions. Steven Pinker (1994) reminded us that Chomsky observed: "virtually every sentence that a person utters or understands is a brand-new combination of words, appearing for the first time in the history of the universe." As parsing systems accommodate how a concept might be expressed, they increase markedly in size and in processing power required for their operation along with increases in human-overhead in the production and maintenance.

Besides difficulties arising out of variability of expression, the probability of accurately processing sentences decreases as sentences increase in length. While most parsing approaches can easily understand "Get me the phone number for Bob.", it is doubtful that very many parsing systems could interpret "Given that I might have to call Bob, later on, I would like you to get me his number so I'll have it if I need it." In as much as the statistical language processing enthusiasts want to believe that we have moved past Chomskyan grammar, the reminders we have not are forever standing before us.

And, it is not just that the prior example contained an uncommon, lengthy way of asking for a phone number. For parsing systems, sentence length itself is positively correlated with both syntax complexity and variability of expression. And that means that, as sentences increase in length, the parsing systems lose functionality. For example, the sentence, "Darwin's theory of evolution is supported by scientific evidence." can probably be processed by high-end parsing systems. The sentence, "Darwinian evolution has been overwhelmingly supported by studies of fossil evidence, genetic similarities among species, physical similarities among species, and even studies of how species change over brief time periods in response to environmental conditions,", will probably be difficult for almost any known parsing system to process.

The average sentence length in a phone conversation frequently hovers around seven words per sentence. In comparison, the average sentence length of a college textbook is often above twenty words a sentence. But it is not just sentence length that presents challenges for parsing systems. While phone conversations may promise shorter sentence lengths than formal text such as that in scientific journal articles, phone conversations also may contain many grammatically incorrect or incomplete sentences.

The point is, had parsing-based systems performed adequately over the last half-century, there would have been no need to create other approaches to processing natural language. Many modern approaches are specifically designed to avoid the step of converting surface structure to deep structure, thus avoiding the overhead of parsing systems. And while we have repeatedly seen that progress with natural language systems falters at the point where the surface structure of communication must be reduced to its deep structure. Only by performing this deep structure reduction step that we can identify semantic equivalency between phrases and, in doing so, evolve to the creation of knowledge-based systems. Without semantic representation, we will always have a "false positive" problem. While we have seen many knowledge-based systems described as semantic-based, the truth is, these systems are usually represented as surface structures. And, as a result, the inherent problem of establishing semantic equivalencies remains.

Even within the parsing approach, numerous attempts at innovation have been developed: CKY (Parsers, Dependency Link Parsers, and Common Cover Link Parsers, to name a few. This would not be going on had parsing lived up to its original expectations first expressed by the fathers of artificial intelligence from the late 1950s to 1970 when so many believed that analyzing human language would prove to be a trivial task for artificial intelligence (AI).

A new approach is warranted. Perhaps this problem should be approached from the perspective of cognitive science rather than the machine learning techniques many are quick to employ today. For example, several journal articles in the last few years' have given a strong indication that word frequency and function both play a large part in how we learn a language (Gervain et al., 2013) and may even aid in how we learn to break language into the phrases. Given these findings, the inventors sought a means to step over parsing individual words and move directly to the identification of high-frequency phrases. And, once having found such a way, wondered if the resulting list of unique high-frequency phrases would be both small compared to the total number of phrases while accounting for a rather large percentage of human language. Because, if the resulting list of phrases met both requirements, that would indicate that we could pre-encode those phrases for semantic content and move human communication from surface structure to deep structure far more efficiently than ever before.

But when we talk about "phrases," as used herein, we are not pushing toward the currently popular n-gram analyses. The correlation between n-grams and properly parsed phrases is nowhere near acceptable. In many corpus analyses, the resulting n-gram lists do not just contain recognizable phrases, but also partial phrases, and frequently are pointing to fragments of two phrase combinations. These partial phrases and two phrase fragments can make up well over half of the n-gram list. For example, referring to Table 1 below, a sample of a subset of such an n-gram analysis from the COCA corpus is provided (36 n-grams from an alphabetized n-gram list derived from a large popular corpus).

TABLE 1

36 n-grams from an alphabetized n-gram list derived from a sizeable famous corpus

| | | |
|---|---|---|
| influence a | influence has | influence of alcohol |
| Influence among | influence has been | influence of drugs |
| Influence an | influence his | influence of his |
| Influence and | influence how | influence of the |
| Influence as | influence in | influence of these |
| Influence at | influence in the | influence on |
| Influence behavior | influence in the region | influence on a |
| Influence by | influence is | influence on his |
| Influence can | Influence it | Influence on me |
| Influence for | Influence its | Influence on our |
| Influence from | Influence of | Influence on the |
| Influence from the | influence of a | influence on their |

There are not very many phrases in these 36 samples that could be characterized as syntactically complete. About one-third of the n-gram phrases end with a preposition while another third end with an article or a possessive pronoun. Ngram lists are not highly correlated with how sentences are broken into phrases in the study of linguistics. In other words, while n-grams are identifiable, the very fact that many n-grams are incomplete phrases, relying on n-grams for language understanding would, at the least, require a lot of post-processing. The inventors were not looking for a process that would yield results such as those produced by n-gram analyses. But rather, we sought to invent an efficient method to identify phrases that would match those phrases of sentences correctly diagrammed by a high school English teacher.

Terms of the Field Defined as Used Herein

We now define several terms of the technical field whose definitions shall apply to all such terms as found in the specification and the claims:

Partitioning Dictionary—A dictionary used by a tumbling frequency algorithm to partition sentences into the phrases and where applicable into the split phrases that constitute phrase chains. The dictionary contains over 8000 high-frequency words along with their word use frequency rank. That frequency rank is also weighted by word function (preposition, conjunction, article, adjective, or pronoun).

Phrase—a group of words (or possibly a single word) that functions as a constituent in the syntax of a sentence, a single unit within a grammatical hierarchy, e.g., noun phrases, verb phrases, and prepositional phrases, that are identified by employing the partitioning dictionary.

Phrase Identification and Splitting—the process of using the partitioning dictionary to a result of identifying phrases in a sentence. This process is accomplished by using the word frequency ranks associated with high-frequency words found in the Partitioning Dictionary to determine where phrases begin and end.

Split Phrase—The process of dividing a phrase into two parts where the initial part is characteristically a single word or a group of words identified by the partitioning dictionary that makes up the high frequency initial functional part of a phrase the syntax of a sentence as a phrase, and where the second content part is made up of common nouns, proper nouns, and non-auxiliary verbs not found in the partitioning dictionary.

Phrase Chain—a group of phrases that frequently occur in a particular order such as noun phrase—verb phrase combinations, verb phrase—noun phrase combinations, and verb phrase—prepositional phrase combinations. The phrases in the phrase chain can be full or partial.

SUMMARY OF EMBODIMENTS OF THE INVENTION

The present disclosure relates to natural language understanding. We have created a process that can effortlessly, quickly, and accurately break natural language into split-phrase chains as defined above_and referred to herein as alpha and beta sub-phrases. Then and more importantly, we have discovered that a finite set of these "split-phrase chains" created using this process account for a considerable percentage of human language. The significance of this result is that, since we are dealing with a finite list of split-phrase chains, these chains, once identified, can be pre-encoded for meaning, allowing for a simpler, faster, and more accurate natural language processing at a semantic level than any parsing approach described—in the known natural language processing art. The Bibliography at the end of the detailed description of the embodiments of our split-phrase tumbling-frequency phrase chain parser provides an overview of the prior art literature directed at prior art natural language processors. It is incorporated herein by reference in its entirety as a Background for embodiments of a tumbling frequency phrase chain parser of the present invention.

DETAILED DESCRIPTION OF EMBODIMENTS OF THE INVENTION

Figure 1:
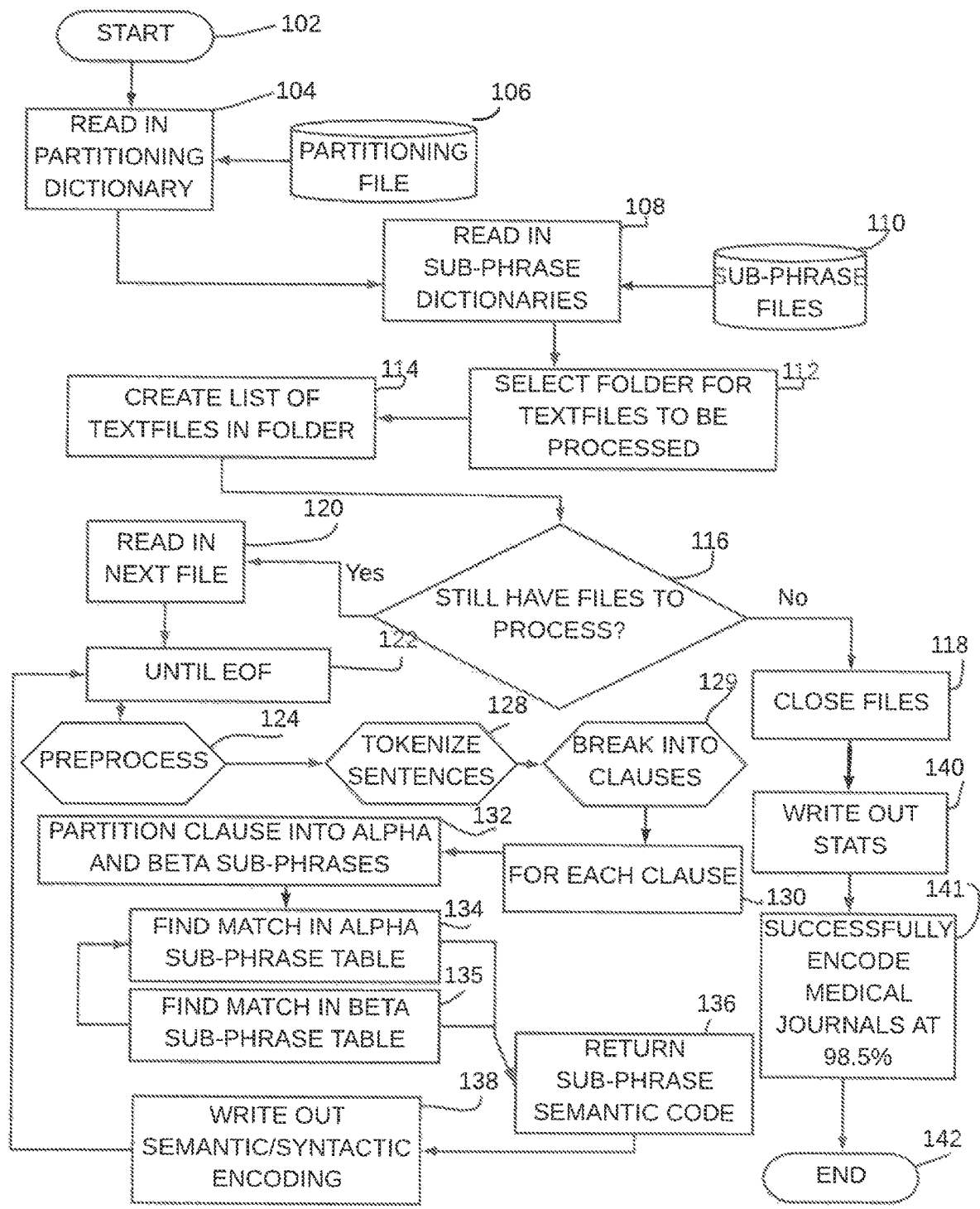
FIG. 1 illustrates a flowchart of an embodiment of a Split-Phrase Tumbling-Frequency Phrase-Chain Parser software algorithm for use at a cloud, a server, a client of a server—a client of a client authenticated in the hierarchy of cloud, server, a client of a server and client of a client.

Before explaining at least one embodiment of the present invention, it must be stated that this invention is not limited in its application to the arrangements of the components or process steps in the following description or illustrated in the drawings. The invention is capable of other embodiments and of being practiced and carried out in various ways. Also, it should be understood that the phraseology and terminology employed are for the purpose of description and should not be regarded as limiting. On the other hand, the terms of the field as defined above are intended to assist in an appreciation of the scope and the claims to the embodiments of the invention.

Of the four primary approaches used to process language by a computer, only the parsing approach considers the semantic and syntactic components in the initial steps. But in doing so, the required resources expand rapidly as the scope and complexity of the language processed increases, and as that scope increases, the performance of parsing systems decreases. This disclosure, however, describes a methodology for understanding natural language that leaps over the word-by-word parsing steps by using a list of patterns, weighted and encoded based on both word function and frequency, to segment natural language sentences into phrases, split phrases, partial phrases, and phrase chains, in particular, comprising a finite list of such chains.

The impetus for the embodiments of the invention disclosed herein was a trend previously observed by the inventors where a word's rank on a frequency-of-use table was positively correlated with the position of a word in a phrase in a sentence. That is to say; it was observed that within a phrase, the ranking of a word within a phrase appeared to usually be lower than the ranking of a word before it. When a higher-ranked word was seen following another word, it generally indicated the start of a new phrase. In noun phrases, for example, the articles and possessive pronouns that often begin a noun phrase have a frequency of use rank higher than adjectives, and adjectives have a frequency of use rank generally higher than the nouns. Based on this observation of word rankings seeming to "tumble" down and "tumble" up and down again as one steps from word to word along a sentence, the inventors first determined to test if sentences might be correctly divided into their constituent phrases by merely processing the word frequency rankings for each word in a sentence.

This work was described in a previous invention, "UNDERSTANDING NATURAL LANGUAGE USING TUMBLING-FREQUENCY PHRASE-CHAIN PARSING", U.S. patent application Ser. No. 16/657,014 filed Oct. 18, 2019. There, the authors reported that this approach was successful in identifying well over 95% of the phrases occurring across general English usage, including textbooks, TV scripts, movie scripts, and Wikipedia.

After submitting that invention to the patent process, however, we discovered that coverage dropped by over 15% in attempting to process scientific journals. We determined that our algorithm only recognized about 80% of the language in a medical journal, for example, because of the vast number of unique vocabulary words (mostly nouns and verbs) that occur in the scientific literature. As a result, we worked to extend the previous invention to bring that coverage back up past 95% for domain-specific: content such as scientific journals without sacrificing the 95% coverage reported previously in processing general English usage. The invention described below is the result of that effort.

Developing the Split-Phrase Tumbling-Frequency Phrase-Chain Parser Algorithm

Development for the embodiment of the invention directed to a split-phrase tumbling-frequency phrase-chain parser occurred primarily in finding a method of splitting the phrases as created in the prior invention that optimized the coverage of our phrase dictionaries. Specifically, we were seeking to provide more robust coverage of English in the domain of scientific journals while maintaining the coverage achieved in the preceding invention. The prior invention was tested against a corpus of 100 textbooks, 8000 movie scripts, all of the English content of Wikipedia, and 11,000 TV episode scripts. In total, this corpus contained over 3.6 billion words. To build and verify the invention disclosed here, we added to the above corpus by downloading 2.7 million scientific journal articles from PubMed. After pre-processing, the contents were added to the pre-existing corpus, thereby creating a new corpus. The new corpus resulted a four factor increase in size over the original test corpus and now contained over 6 billion sentences.

We processed this corpus using the prior invention. At this point, we ran dozens of analyses on the resulting phrases. We soon discovered that, syntactically, the vast majority of the phrases were ending in either non-auxiliary verbs or common and proper nouns. The next area of our effort focused on ways to reorganize phrase segments that capitalized on repeated patterns of words within phrases. While this work was going on, there was also an effort underway to determine the most viable approach to weighting and reorganizing in a partitioning dictionary (FIG. 1, step 104), that is, the weighted high-frequency word list that is used to identify phrase patterns within sentences. This list existed in a dictionary form, where a word was looked up, and having been found, a numeric value associated with that word was passed back to the algorithm to be used in the tumbling frequency process.

We revisited several methods used to find the optimal method of breaking language. The original partitioning dictionary contained just under 9000 entries with the frequency ranks weighted by word function associated with each rank, rounded to the nearest integer. After trying several approaches is we decided to extract all non-auxiliary verbs and nouns from this list (not including pronouns). The resulting list contained just over 4000 words. We reran the contents of the new corpus using the new partitioning dictionary. The parts of phrases that were included in the 4000-word partitioning list were identified as alpha sub-phrases. In contrast, those sub-phrases not containing words found in the partitioning list were classified as beta sub-phrases.

The next step in the development was to create the Split-Phrase Phrase-Chain Parser Program (FIG. 1). That program uses the partitioning file 106 and 2.4 million entry NLP phrases with the semantic/syntactic encodings to process sentences from a test corpus.

Referring to FIG. 1, FIG. 1 shows the flow chart steps required to process text through the Split-Phrase Tumbling Frequency Phrase-Chain Parser. The process begins at Start (102) and begins (104) by reading in the partitioning dictionary, the 4000 high frequency words and associated weighted component that is used by separate sentences into sub-phrases.(read in partitioning dictionary) from (106) the Partitioning file which contains the word, and associated weighted frequency rank for each item on the list. The word/weighted frequency rank pair constitutes a single item in the partitioning dictionary (104). This process continues until all of the lines in the text file are processes.

Next (110) the alpha sub-phrases and beta sub phrases are read into the sub-phrase dictionaries (108) are read in along with a chain that represents the semantic encoding for each sub-phrase. These sub-phrases and associated semantic encoding chains are used to construct the dictionaries. The alpha sub-phrases are made up of words identified in the partitioning dictionary, while the beta sub-phrases are made up of words not found in the partitioning dictionary. These words are made up of words used with high frequency in communication, such as articles, prepositions, auxiliary verbs, adjectives, and pronouns. The alpha sub-phrase file is encoded in the alpha sub-phrase dictionary and the beta sub-phrase file is encoded in the beta sub-phrase dictionary, respectively. The sub-phrase files (110) are read in to the two sub-phrase dictionaries (108) for each item on the list. These text files contain the sub-phrase chains, defined above, as a text string, and associated semantic/syntactic encoding for each item on the list. The phrase-semantic/syntactic encoding constitute a single item in the NLP dictionary. This process continues until all the lines in the text file are processed.

TABLE 2

Examples of Alpha sub-phrases

| of all final | %019 a84 j01879 |
| of all final active | %019 a84 j01879 j02825 |
| of all final derivatives | %019 a84 j01879 + 469831 |
| of all final experimental | %019 a84 j01879 j02000 |
| of all final heavy | %019 a84 j01879 j01428 |
| of all final organic | %019 a84 j01879 j01123 |

TABLE 3

Examples of Beta sub-phrases

| candidate mgcs | o005946 + 10681712 |
| candidate mge contig contain | o005946 + 5497707 + 1429202 v02292 |
| candidate mglabd-interacting proteins | o005946 + 18868889 n109649 |
| candidate mgmt probes | o005946 +10464740 v30837 |

In the next step, the folder containing the text files for the corpus is identified (select folder containing text files to be processed 112). From this folder, a list of text files in the folder is created (create list of text files in folder 114). This list will be used to select, open, and close each text file as it is processed. Each line of the file is read in until an end-of-file tag is encountered.

As a line of a natural language speech or writing is brought in, it is taken through a preprocessing step where special characters may be removed. Then the total collection of lines is moved through a sentence tokenizer. At this point we are now working with sentences instead of lines of text.

Each sentence is broken into clauses based on punctuation. And for each clause, the words are partitioned into phrases using the partitioning dictionary. At that point, each phrase is broken into an alpha sub-phrase and a beta sub-phrase. The alpha sub-phrase is then matched against the alpha table (134) while the beta sub-phrase, is matched against the beta table (135) and the associated semantic/syntactic codes are collected for both (136). The complete sentence is broken into phrases and paired with asemantic/syntactic code, and this pairing is then written out to the resulting file (138). The process is continued until all lines in all files in the selected folder have been processed, step 118.

The final version of the Split-Phrase Tumbling-Frequency Phrase-Chain Parser program contained about 200 lines of code (with blank lines and comments removed). That program is included in Appendix A. Appendix A is subject to copyright as follows: © William Randolph Ford 2020, The copyright owner, Mr. Ford, has no objection to the facsimile reproduction by anyone of the patent document or the patent disclosure, as it appears in the United States Patent and Trademark Office patent file or records, but otherwise reserves all copyrights whatsoever for the attached Appendix A or for the flowchart of FIG. 1. Appendix A is submitted after the Bibliography and before the claims and Abstract of the Disclosure.

TABLE 4

Example of Sentence first separated into phrases and then encoded from Alpha & Beta Split-Phrase Dictionaries Lack of participation can come about through noncontact, refusal or death of the respondent.
lack:° of participation: ° can ° come: ° about through noncontact:
° refusal: ° or ° death: ° of the respondent:

TABLE 4-continued

Example of Sentence first separated into phrases and then
encoded from Alpha & Beta Split-Phrase Dictionaries v00195 ° %019 o006937 ° x17 ° v00031 ° %187 %028 +1954049
° o01065 ° +000032 ° o006039 ° %019 a04 o109819

Figure 2:
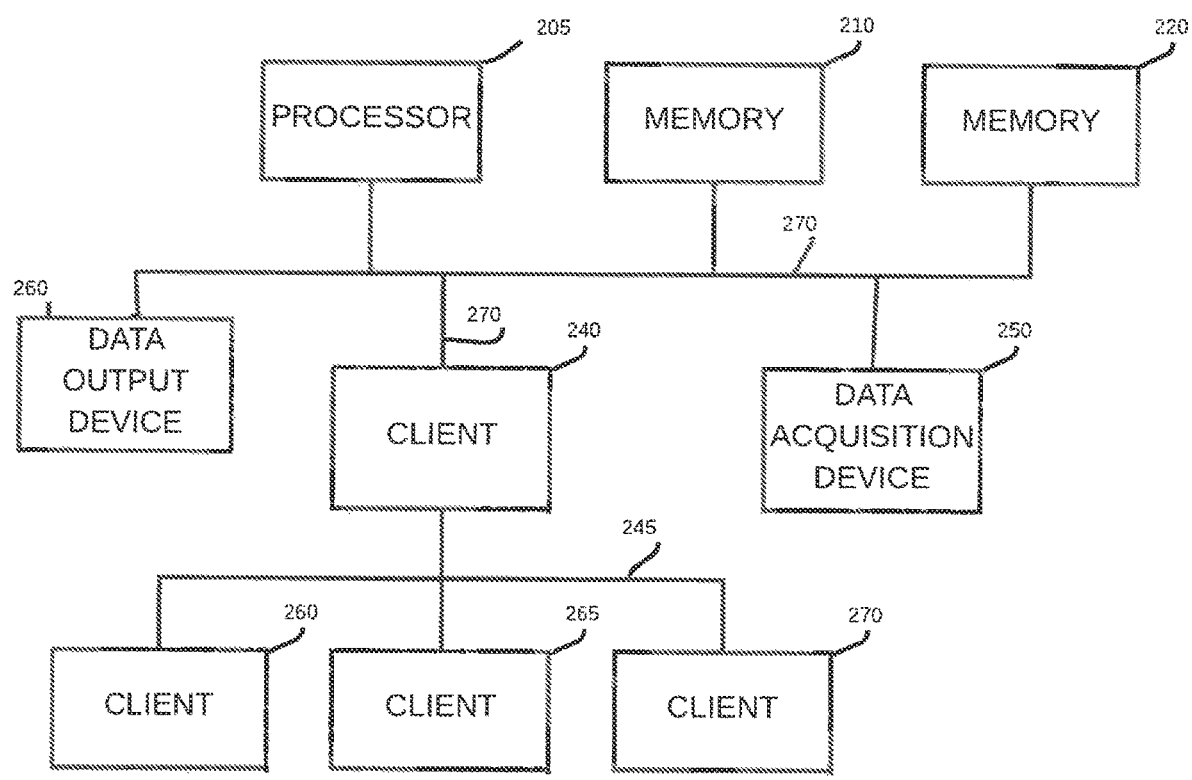
FIG. 2 is an exemplary diagram of data processing environments in which the exemplary aspects of the present disclosure may be implemented where a cloud is not shown, nor a server, but are well known in the art.

FIG. 2 shows a known processor 205 programmed by a special purpose parsing software per FIG. 1 and Appendix A code stored in at least memory 210 and a storage 220 which is preferably local but may be in the "cloud." For example, a natural language processor collection of files 110 may be located in storage 220 and the partitioning file may be an input file input through data acquisition device 250 and stored in at least either memory 210 or storage 220. 230 may be a bus that connects computer processor parts together. 255 may be any communication system with a client 240 or a cloud. There may be more than one client processor 240 having an input such as a real or virtual keyboard, a mouse or other known selection device such as a cursor and click pad. 245 may be any communication system to connect clients to other clients or to the cloud. 255 output devices may comprise a display or an output of semantic/syntactic coding provided by a printer. Not shown are authenticated wireless communication devices for communication with the cloud or a remote database. The present parsing software may be run as described by FIG. 1, for example, on practically any typical personal computer having a natural language processor of the present invention using tumbling frequency phrase chain parsing.

Referring to FIG. 2, any computer code of the present embodiments may be located in the "cloud" (not shown) and be accessed by servers (not shown) and, further be accessed by client devices and client devices connected to client devices. The processor 206 has access to memory 210,220 which is used to store index and store word structures that enable rapid access to stored phrases that have similarities to the attributes of a chain of phrases specified in an input from a data accessing device 250. Storage 210, 220 is utilized to provide persistent or temporary memory and to serve as a repository for information that does not need to be accessed as efficiently (rapidly) as the in-memory phrases. It is implicit to note forms of the cloud that, for example, a user, password and changing two step authentication may be used to access the cloud software. Similarly, a server may require two step authentication as may a client or processor or client of a processor and a client may access a data acquisition device by a network or a bus system 290. For example, images of the software may reside in storage 210 while descriptions of the shapes of segments of natural language or other attributes of the natural language may reside in memory. One or more clients 260, 265, 270 can submit queries to the server's software, which are interpreted by the processor 205 in order to perform searches using the phrase chains that are resident in memory 220 and, possibly, the data contained in the storage 210. NLP results are returned by the processor 205 to the clients 260, 265, 270 via network 290. Users can interact with the system through the clients(s) 260, 265, 270 using input devices such as a keyboard and mouse and output devices such as a display or printer. All of the components may be implemented in a single computer system such as a laptop, desktop, server cloud server or they may be implemented in separate computers that interact using a communications medium such as a wired or wireless network 290 using two step authentication.

A data acquisition device 250 may be connected to either a client 260, 265, 270 or a server or the cloud using an interface such as a serial interface, Ethernet, a data acquisition and control card, a universal serial bus (USB), or a FireWire bus or network (wireless or wired). Example data acquisition devices include scanners, microscopes (optical, electron, or confocal), cameras (still image or video), antennas, infrared sensors, acoustic sensors, laser rangefinders, or scanners, and spectroscopic instrumentation or related field-portable devices such as a device for detecting energetic particles. A data acquisition device may receive unprocessed natural language to be processed by the cloud, a server, a client, or a client of a client. The interface to the data acquisition device 250 may be bi-directional, meaning that the server or client can control the operation of the data acquisition device 250 to, for example, locate and examine portions of natural language that are subject to analysis. The data acquisition device 250 may utilize a wireless, wired, acoustic, or optical communications link to control a remote device and/or acquire information from a remote device, for example, such as a book player playing a recording of a novel.

Referring to FIG. 2, this test was performed on an Intel Core i7-6700K with 64 gigabytes of Corsair LPX DDR4 RAM and a Samsung 860 EVO SSD. All calculations were performed in Python on a single thread.

We tested the parser on over 10 million lines of text extracted from recent journal articles and recorded the performance. In that test, the program correctly identified and encoded 98.5% of the phrases.

Table 5 illustrates an embodiment of a sample of processed sentences broken into phrase chains and semantically encoded. The ° indicates breakpoints in the sentences of the Table,

TABLE 5

Non-participation in epidemiological studies has the potential to
introduce bias into the results of such studies.
non-participation:ZXZXZ ° in epidemiological studies:ZXZXZ ° has
° the potential ° to introduce:ZXZXZ bias:ZXZXZ °
into the results:ZXZXZ ° of such studies:ZXZXZ o180902 °
%207 +442920 v30227 ° >3 ° a04 j02186 ° %030 v00134
v00872 ° %018 a04 n002015 ° %019 j10244 v30227
Lack of participation can come about through noncontact, refusal or
death of the respondent.
lack:ZXZXZ ° of participation:ZXZXZ ° can ° come:ZXZXZ ° about
through noncontact:ZXZXZ ° refusal:ZXZXZ ° or ° death:ZXZXZ
° of the respondent:ZXZXZ v00195 ° %019 o006937 ° x17
° v00031 %187 %028 +1954049 ° o01065 ° +000032 ° o006039
° %019 a04 o109819
This problem becomes accentuated in longitudinal studies in which
non-random attrition can be expected at each wave.
this problem:ZXZXZ becomes:ZXZXZ accentuated:ZXZXZ ° in
longitudinal studies:ZXZXZ ° in ° which ° non-random:ZXZXZ
attrition:ZXZXZ ° can ° be ° expected:ZXZXZ ° at each wave:ZXZXZ
a07 o005259 v32586 v20888 ° %207 j04545 v30227 ° %207 ° @70
° +712388 o107390 ° x17 ° ^0 ° v22180 ° %101 a03 v00180
In studies of elderly samples, the problem of attrition is accentuated
by the increased rate of deaths.
in studies:ZXZXZ ° of elderly:ZXZXZ samples:ZXZXZ ° the
problem:ZXZXZ ° of attrition:ZXZXZ ° is ° accentuated:ZXZXZ ° by
the increased:ZXZXZ rate:ZXZXZ ° of deaths:ZXZXZ %207 v30227 °
%019 o266451 v31927 ° a04 o005259 ° %019 o107390 ° ^3 ° v20888 °
%013 a04 v22402 v02462 ° %019 n006039
Also, such samples may have reasons for refusal which are specific to
older age groups.
also ° such samples:ZXZXZ ° may ° have ° reasons:ZXZXZ ° for
refusal:ZXZXZ ° which ° are ° specific ° to older age:ZXZXZ
groups:ZXZXZ b03275 ° j10244 v31927 ° x16 ° >0 ° v31852 ° %014
o01065 ° @70 ° ^2 ° o111859 ° %030 j02345 v02909 v31628

The aspects, advantages and/or other features of example embodiments of the invention will become apparent in view of the following detailed description, taken in conjunction with the accompanying drawings. It should be apparent to those skilled in the art that the described embodiments of the present invention provided herein are merely exemplary and illustrative and not limiting. Numerous embodiments of modifications thereof are contemplated as falling within the scope of the present invention and equivalents thereto. Any publications, patent applications, patents, and other references mentioned herein are incorporated by reference in their entirety.

Although the invention has been described in example embodiments and the split-phrase tumbling-frequency phrase-chain parsing method disclosed, additional modifications and variations would be apparent to those skilled in the art. It is, therefore, to be understood that the inventions herein may be practiced other than as specifically described. For example, by replacing the chain of semantic codes for words for a phrase with a single semantic code for that phrase, this parser can be easily modified to function as a natural language processor. Such a modification could be performed by simply tagging the single semantic codes for each phrase as it fulfills its role within a subject-verb-object (SVO) structure. That SVO structure can be taken down to a single semantic representation of the deep structure for a sentence or message.

Once the modification in the step above has been performed, the natural language processor created by following the above steps can be reversed to function as a natural language generator. In order to perform this task, one would need only to use the frequency of a particular phrase used in the generation of surface structure from the deep structure.

Given the natural language processor and natural language generator described in the last two paragraphs above, these two inventions can be combined to perform language translation using these two processes to drive a surface structure down to deep structure in one language, and back from deep structure up to the surface structure in a second language.

In addition to the three inventions described in the last three paragraphs, by taking the symbolic representation derived from the natural language processor, an additional invention of a semantic knowledge base can easily be constructed from those codes.

In addition to the four inventions described in the last four paragraphs, by taking using the frequency of occurrence of the phrases identified by the parser and used in the natural language processor, if this invention from this methodology would involve changing the readability level of surface structures by using the frequency of occurrence in the natural language generator.

For the rules assumed, the mathematical model used, the definitions and examples of tumbling frequency and phrase chain, feedback data and related processes, the features useful and provided by a typical computer processor operating as a natural language process having an output, for example, and a keyboard and display screen, etc. Thus, the present embodiments should be considered in all respects as illustrative and not restrictive. Accordingly, it is intended that such changes and modifications fall within the present invention as defined by the claims appended hereto.

BIBLIOGRAPHY

Patent Citations (7)

1. U.S. Pat. No. 5,095,432A *Jul. 10, 1989 Mar. 10, 1992 Harris Corporation Data processing system implemented process and compiling technique for performing context-free parsing algorithm based on register vector grammar
2. U.S. Pat. No. 5,926,784A Jul. 17, 1997 Jul. 20, 1999 Microsoft Corporation Method and system for natural language parsing using podding
3. U.S. Pat. No. 5,930,746A *Mar. 20, 1996 Jul. 27, 1999 The Government Of Singapore Parsing and translating natural language sentences automatically
4. U.S. Pat. No. 6,108,620A Jul. 17, 1997 Aug. 22, 2000 Microsoft Corporation Method and system for natural language parsing using chunking
5. U.S. Pat. No. 6,236,959B1 Jun. 23, 1998 May 22, 2001 Microsoft Corporation System and method for parsing a natural language input span using a candidate list to generate alternative nodes
6. U.S. Pat. No. 7,599,831B2 Mar. 14, 2003 Oct. 6, 2009 Sonum Tech Inc Multi-Stage pattern reduction for natural language processing
7. U.S. Pat. No. 9,720,903B2 *Aug. 19, 2017 Mar., 30, 2004 Robert D. New Method for parsing natural language text with simple links Non-Patent Citations (11)

1. Abney, S. "Parsing by Chunks" Principle-Based Parsing, R. Berwick, S. Abney, C. Tenny (eds.). Kluwer Academic Publishers., Nov. 10, 1994, pp. 1-18.
2. Bobrow, D., Kaplan, R., Kay, M., Norman, D., Thompson, H. and Winograd, T. (1977) GUS, a frame driven dialog system. Artificial Intelligence, 8: 155-173.
3. Chomsky, N. Verbal Behavior. By B. F. Skinner. Language, 1959, 35, 26-58.
4. Farreras, I. G., & Ford, W. R. (2014, June). *The evolution of a discipline: How the semantics of introductory psychology textbooks have changed over the last century.* Paper presented at the 46$^{th}$ annual meeting of Cheiron: The International Society for the History of Behavioral and Social Sciences, Frederick, Md.
5. Ford, W. R., & Farreras, I. G. (2015, April) *Using a multi-stage pattern reduction NLP for syntactic analysis of unstructured data.* Paper presented at the 2015 Analytics Applications Summit, Harrisburg, Pa.
6. Gervain, et al. (2013) Word frequency cues word order in adults: cross-linguistic evidence, Front. Psychol., 02
7. Green, B. F., Wolf, A. K., Chomsky, C. and Laughery, K. (1961) BASEBALL: An automatic question answerer. Proceedings Western Joint Computer Conference 19, pp. 219-224.
8. Green, C. (1969) Theorem proving by resolution as a basis for question-answering systems. Machine Intelligence, 4: 183-205.
9. Hill, J. R., Ford, W. R., & Farreras, I. G. (2015). Real conversations with artificial intelligence: A comparison between human-human online conversations and human-chatbot conversations. *Computers in Human Behavior*, 49, 245-250.
10. Marcus, M., et al., "Building a Large Annotated Corpus of English: The Penn Treebank." Computational Linguistics, 1993, 19(2): 313-330.
11. Pinker, S. (1994). *The language instinct: The new science of language and mind.* London: Allen Lane, the Penguin Press,

APPENDIX A

©2020 William Randolph Ford

```python
Identify_phrases.py
def main(folder_in: pathlib.WindowsPath, folder_out: pathlib.WindowsPath, freq: pathlib.WindowsPath) -> None:
    freq_bands = load_frequency_bands(freq)
    process_folder(folder_in, folder_out, freq_bands)
# read in frequency bands
def load_frequency_bands(path: pathlib.WindowsPath) -> dict:
    start = time.time( )
    print(f'loading {path.stem} ...', end = '', flush = True)
    frequency_bands = np.load(path, allow_pickle = True).item( )
    (minutes, seconds) = divmod(int(time.time( ) - start), 60)
    print(f'loaded {len(frequency_bands):,} frequencies in {minutes}m{seconds}s')
    return frequency_bands
# for every file in a folder, if the file is a document, run 'identify_phrases_in_document( )'
def process_folder(folder_in: pathlib.WindowsPath, folder_out: pathlib.WindowsPath, freq_bands: dict) -> None:
    start = time.time( )
    i = 1
    sentence_count = 0
    widgets = [ 'Processing File # ', pb.Counter( ), ' ', pb.Timer( ), ' ', pb.BouncingBar(marker = ' ', left = '[', right = ']')]
    with pb.ProgressBar(widgets = widgets) as bar:
        for file_name in folder_in.iterdir( ):
            bar.update(i)
            i = i + 1
            if file_name.is_file( ) and file_name.suffix.lower( ) == '.txt':
                document_name = file_name
                new_document = identify_phrases_in_document(document_name, freq_bands)
                utils.write_new_document(folder_out, document_name, new_document)
                sentence_count = sentence_count + len(new_document)
    seconds = time.time( ) - start
    print(f'Processed (sentence/sec): {sentence_count:,}/{int(seconds):,} = {int(sentence_count/seconds):,} sps')
# on a document level, break out the sentences
# on a sentence level, break out the clauses
# on a clause level, break out the phrases
# for each clause, run 'identify_phrases( )'
def identify_phrases_in_document(document_name: pathlib.WindowsPath, freq_bands: dict) -> list:
    with document_name.open('r', encoding = 'utf-8') as document:
        lines = document.readlines( )
    sentences = lines
    new_sentences = [ ]
    for sentence in sentences:
        new_sentence = [ ]
        sentence = clean_sentence(sentence)
        clauses = utils.my_split(sentence, '"')
        for clause in clauses:
            phrases = identify_phrases_in_clause(clause, freq_bands)
            new_sentence.extend(phrases)
        new_sentences.append(new_sentence)
    document = new_sentences
    return document
# cleans known junk from a sentence
def clean_sentence(sentence: str) -> str:
    if sentence.startswith("-"):
        sentence = sentence[1:]
    sentence = sentence.strip( )
    sentence = re.sub(r"[.?!]", "", sentence)
    sentence = sentence.replace('"', '"')
    sentence = sentence.replace('#', ' ')
    sentence = sentence.replace("Ãcâ‚¬â œ", "-")
    sentence = sentence.replace("Ãcâ‚¬â„c", '"')
    sentence = sentence.replace('*', ' ')
    sentence = re.sub(r"[:=;. | ( ){ },]", '"', sentence)
    sentence = sentence.replace("[", '"')
    sentence = sentence.replace("-", '"')
    sentence = sentence.replace("]", '"')
    sentence = sentence.strip( )
    return sentence
# break the clause into an list of phrases
def identify_phrases_in_clause(clause: str, freq_bands: dict) -> list:
    words = utils.my_split(clause, ' ')
    old_frequency_band = 0
    new_clause = ""
    for word in words:
        word = word.strip( ).lower( )
        if len(word) > 0:
            frequency_band = freq_bands.get(word, 9)
            if frequency_band == 1:
                new_clause = f'{new_clause}"{word}"'
            elif frequency_band == 4:
```

APPENDIX A-continued

©2020 William Randolph Ford

```
                    new_clause = f'{new_clause} {word}2'
                elif frequency_band < old_frequency_band:
                    new_clause = f'{new_clause}2{word}'
                elif frequency_band > 6:
                    if new_clause.endswith(':ZXZXZ2'):
                        new_clause = new_clause[0:-1]
                    new_clause = f'{new_clause} {word}:ZXZXZ2'
                else:
                    new_clause = f'{new_clause} {word}'
                old_frequency_band = frequency_band
    phrases = utils.my_split(new_clause, '2')
    return phrases
encode_phrases.py
def main(folder_in: pathlib.WindowsPath, folder_out: pathlib.WindowsPath, alpha: pathlib.WindowsPath, beta:
pathlib.WindowsPath) -> None:
    alpha_encoding = load_phrase_encoding(alpha)
    beta_encoding = load_phrase_encoding(beta)
    alpha_trace = { }
    beta_trace = { }
    process_folder(args.folder_in, args.folder_out, alpha_encoding, beta_encoding, alpha_trace, beta_trace)
    del alpha_encoding, beta_encoding
    save_trace(folder_out.joinpath('_alpha.trace.txt'), alpha_trace)
    save_trace(folder_out.joinpath('_beta.trace.txt'), beta_trace)
    del alpha, beta
# read in phrase encoding
def load_phrase_encoding(path: pathlib.WindowsPath) -> dict:
    start = time.time( )
    print(f'loading {path.stem}...', end = '', flush = True)
    phrase_map = np.load(path, allow_pickle = True).item( )
    (minutes, seconds) = divmod(int(time.time( ) - start), 60)
    print(f'loaded {len(phrase_map):,} encodings in {minutes}m{seconds}s')
    return phrase_map
# for every file in a folder, if the file is a document, run 'encode_phrases_in_document( )'
def procsss_folder(folder_in: pathlib.WindowsPath, folder_out: pathlib.WindowsPath, alpha_encoding: dict,
beta_encoding: dict, alpha_trace: dict, beta_trace: dict) -> None:
    start = time.time( )
    i = 1
    sentence_count = 0
    widgets = [ 'Processing File # ', pb.Counter( ), ' ', pb.Timer( ), ' ', pb.BouncingBar(marker = '.', left = '[', right = ']')]
    with pb.ProgressBar(widgets = widgets) as bar:
        for file_name in folder_in.iterdir( ):
            bar.update(i)
            i = i + 1
            if file_name.is_file( ) and file.name.suffix.lower( ) == '.txt':
                document_name = file_name
                new_document = encode_phrases_in_document(document_name, alpha_encoding, beta_encoding,
alpha_trace, beta_trace)
                utils.write_new_document(folder_out, document_name, new_document)
                sentence_count = sentence_count + len(new_document)
    seconds = time.time( ) - start
    print(f'Processed (sentence/sec): {sentence_count:,}/{int(seconds):,} = {int(sentence_count/seconds):,} sps')
# on a document level, break out the sentences
# on a sentence level, break out the phrases
# for each phrases, run 'encode_phrase( )'
def encode_phrases_in_document(document_name: pathlib.WindowsPath, alpha_encoding: dict, beta_encoding:
dict, alpha_trace: dict, beta_trace: dict) -> list:
    with document_name.open('r', encoding = 'utf-8') as document:
        lines = document.readlines( )
    sentences = lines
    new_sentences = [ ]
    for sentence in sentences:
        new_sentence = [ ]
        phrases = utils.my_split(sentence, '2')
        for phrase in phrases:
            new_phrase = encode_phrase(phrase, alpha_encoding, beta_encoding, alpha_trace, beta_trace)
            new_sentence.append(new_phrase)
        new_sentences.append(new_sentence)
    document = new_sentences
    return document
# break the clause into an list of phrases
def encode_phrase(phrase: str, alpha_encoding: dict, beta_encoding: dict, alpha_trace: dict, beta_trace: dict) -> str:
    words = utils.my_split(phrase, ' ')
    alpha_encode = encode_alpha_phrase(words, alpha_encoding, alpha_trace)
    beta_encode = encode_beta_phrase(words, beta_encoding, beta_trace)
    if beta_encode == None:
        return alpha_encode
    elif alpha_encode == None:
```

APPENDIX A-continued

©2020 William Randolph Ford

```python
        return beta_encode
    else:
        return f'{alpha_encode} {beta_encode}'
# alpha encoding uses an all-or-nothing aproach to encoding
def encode_alpha_phrase(words: list, alpha_encoding: dict, alpha_trace: dict) -> str
    alpha_phrase = [word for word in words if not word.endswith(':ZXZXZ')]
    if len{alpha_phrase) == 0:
        return None
    alpha_phrase = ' '.join(alpha_phrase)
    alpha_encode = alpha_encoding.get(alpha_phrase, f'UAUAU:[{alpha_phrase}]')
    add_trace(alpha_trace, alpha_phrase, alpha_encode)
    return alpha_encode
# adds counts to the trace
def add_trace(trace: dict, phrase: str, encoding: str) -> None:
    tmp = f'{phrase}\t{encoding}'
    trace[tmp] = trace.get(tmp, 0) + 1
# beta encoding uses a recursive-pattern-reduction aproach to encoding
# unlike prior rpr encodings, an unknown in the middle of a search short
# circuts all the rest of the words to be unknow too
def encode_beta_phrase(words: list, beta_encoding:dict, beta_trace: dict) -> str:
    beta_phrase = [word[0:-6] for word in words if word.endswith(':ZXZXZ')]
    if len(beta_phrase) == 0:
        return None
    encoded_phrase = [ ]
    while len(beta_phrase) > 0:
        for i in range(len(beta_phrase), 0, -1):
            temp_phrase = ' '.join(beta_phrase[0:i])
            temp_enc = beta_encoding.get(temp_phrase, None)
            if temp_enc != None:
                encoded_phrase.append(temp_enc)
                add_trace(beta_trace, temp_phrase, temp_enc)
                beta_phrase = beta_phrase{i:len(beta_phrase)]
                break
        if temp_enc == None:
            temp_phrase = ' '.join(beta_phrase)
            temp_enc = f'UBUBU:[{temp_phrase}]'
            encoded_phrase.append(temp_enc)
            add_trace(beta_trace, temp_phrase, temp_enc)
            break
    beta_encode = ' '.join(encoded_phrase)
    return beta_encode
# saves a python 'dict' as a 'txt' object for later reference
def save_trace(path_out: pathlib.WindowsPath, trace: dict) -> None:
    start = time.time( )
    print(f'saving{path_out.stem}...', end='' flush = True)
    with path_out.open('w', encoding = 'utf-8') as save_file:
        for item in sorted(trace.items( ), key = lambda kv: kv[1], reverse = True):
            save_file.write(f'{item[1]}\t{item[0]}\n')
    (minutes, seconds) = divmod(int(time.time( ) - start), 60)
    print(f'saved {len(trace):,} recoard(s) in {minutes}m{seconds}s')
```

What we claim is:

1. Apparatus comprising a special purpose computer natural language processor using tumbling frequency phrase chain parsing, the natural language processor apparatus comprising
a partitioning file to be read into a partitioning dictionary,
the partitioning dictionary,
a natural language processing dictionary,
a natural language processing file to be read into the natural language processing dictionary, the natural language processing file including at least one scientific journal article,
the natural language processor repeating selecting folders to be processed containing text files and creating lists of the text files in the folders,
the natural language processor further deciding if there exist further text files to process and continuing by preprocessing, tokenizing sentences, breaking the sentences into clauses and applying tumbling frequency phrase chain parsing, and
further processing by, for each clause, partitioning each phrase into first and second sub-phrases, matching the first and second sub-phrases in the natural language processing dictionary and outputting one of the phrase chain and its semantic/syntactic meaning until the end of the at least one scientific journal article of a text file is reached, and
if the first and second sub-phrases cannot be matched, add the first and second sub-phrases to a sub-phrase dictionary.

2. Apparatus of claim 1 using frequency of a particular phrase used in the generation of a surface structure from a deep structure of natural language.

3. Apparatus of claim 1 wherein the natural language processor uses high-frequency occurring partial phrases of natural language.

4. Apparatus of claim 1 comprising the natural language processor and a natural language generator and combining them to perform language translation using these to drive a surface structure down to deep structure in one language, and back from deep structure up to the surface structure in a second language.

* * * * *